(12) United States Patent
Louh

(10) Patent No.: US 8,202,451 B2
(45) Date of Patent: Jun. 19, 2012

(54) METHOD OF MAKING A LENS ASSEMBLY ARRAY

(75) Inventor: Sei-Ping Louh, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 358 days.

(21) Appl. No.: 12/537,355

(22) Filed: Aug. 7, 2009

(65) Prior Publication Data

US 2010/0118410 A1    May 13, 2010

(30) Foreign Application Priority Data

Nov. 12, 2008    (CN) .......................... 2008 1 0305502

(51) Int. Cl.
*B29D 11/00* (2006.01)
(52) U.S. Cl. ............ 264/1.7; 264/2.2; 264/2.5; 425/808
(58) Field of Classification Search .................. 264/1.1, 264/1.7, 2.2, 2.3, 2.4, 2.5; 425/808
See application file for complete search history.

(56) References Cited

U.S. PATENT DOCUMENTS

| 3,971,841 | A | * | 7/1976 | Rubinstein ..................... 264/275 |
| 4,891,053 | A | * | 1/1990 | Bartman et al. .................. 65/64 |
| 4,895,585 | A | * | 1/1990 | Angenent et al. ................. 65/39 |
| 7,780,880 | B2 | * | 8/2010 | Ito ................................. 264/2.5 |
| 8,092,725 | B2 | * | 1/2012 | Tsuji ............................ 264/1.38 |
| 2006/0284327 | A1 | * | 12/2006 | Yamamichi ................... 264/1.32 |

* cited by examiner

*Primary Examiner* — Mathieu D. Vargot
(74) *Attorney, Agent, or Firm* — Altis Law Group, Inc.

(57) ABSTRACT

A first lens having a first bottom surface and a first top surface at opposite sides thereof; and a first supporter having a first supporting surface and a second supporting surface at opposite sides thereof, the first supporting surface being flat, the second supporting surface being in contact with the first bottom surface, the first supporter being made of transparent material, and a refraction index of the first supporter being different from a refraction index of the first lens. A lens assembly array and method of making the lens assembly array are also provided.

8 Claims, 18 Drawing Sheets

METHOD OF MAKING A LENS ASSEMBLY ARRAY

BACKGROUND

1. Technical Field

The present disclosure relates to lens assemblies, lens assembly arrays and methods of manufacturing the lens assemblies and lens assembly arrays by press molding.

2. Description of Related Art

Wafer-level optical lenses are usually manufactured by press-molding a plurality of optical lenses on one or both sides of a transparent substrate.

A lens assembly is usually formed by combining a plurality of single lenses with other optical components, such as a filter and a spacer, for example. It is required that the individual lenses be coaxially arranged. However, a coaxial lens assembly is often hard to achieve by assembling the lenses one by one.

What is needed, therefore, is a lens assembly and a method of making the lens assembly which can overcome the above shortcomings.

BRIEF DESCRIPTION OF THE DRAWINGS

Many aspects of the present lens assembly, lens assembly array, and methods of making the lens assembly and lens assembly array can be better understood with reference to the following drawings. The components in the drawings are not necessarily drawn to scale, the emphasis instead being placed upon clearly illustrating the principles of the present lens assembly, lens assembly array and methods. Moreover, in the drawings, like reference numerals designate corresponding parts throughout the several views.

DETAILED DESCRIPTION OF THE EMBODIMENTS

Figure 1:
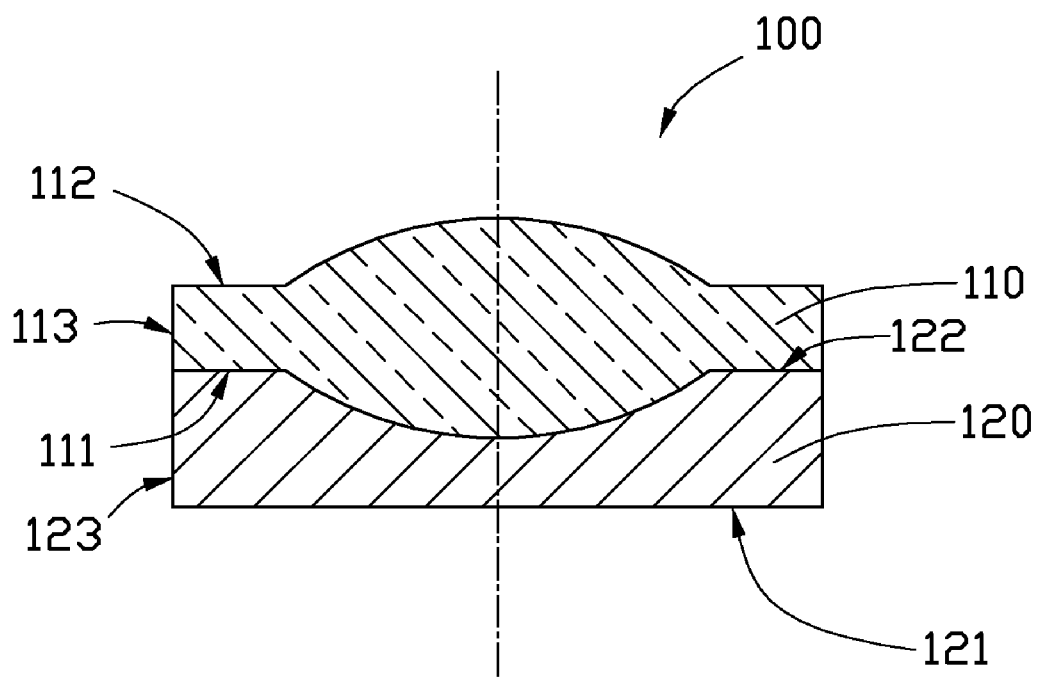
FIG. 1 is cross-sectional view of a lens assembly in accordance with a first embodiment, showing a central axis thereof as a broken line.

A lens assembly 100 in accordance with a first embodiment is shown in FIG 1. The lens assembly 100 includes a first lens 110, and a first supporter 120 integrally formed with the first lens 110. The first lens 110 has a bottom surface 111 and a top surface 112 at opposite sides thereof, and a peripheral first side surface 113 interconnecting the bottom surface 111 and the top surface 112. In this embodiment, the first lens 110 is a biconvex lens. In other embodiments, the first lens can be a biconcave lens or a positive meniscus lens. The supporter 120 has a first surface 121 and a second surface 122 at opposite sides thereof, and a peripheral first sidewall 123 interconnecting the first surface 121 and the second surface 122. The first surface 121 is flat. The second surface 122 is fully in contact with the bottom surface 111. That is, a shape of the second surface 122 matches a shape of the bottom surface 111.

The first lens 110 is coaxial with the first supporter 120. The first lens 110 and the first supporter 120 are each substantially circular or disk shaped. A maximum diameter of the first lens 110 is equal to that of the first supporter 120, in order to ensure that the first side surface 113 of the first lens 110 can be aligned with the first sidewall 123 of the first supporter 120.

The first lens 110 as well as the first supporter 120 can be made of thermosetting material or thermoplastic material, either of which has properties of high transmittance and a low light absorption rate. The refraction index of the first lens 110 is different from that of the first supporter 120. For example, the refraction index of the first lens 110 can either be higher than that of the first supporter 120, or lower. The high refraction index range is from 1.55 to 1.60. The low refraction index range is from 1.45 to 1.49. For example, the high refraction index material is polycarbonate, and the low refraction index material is polymethyl methacrylate. Due to the refractivity difference between the first lens 110 and the first supporter 120, the inherent optical properties of the bottom surface 111 and the top surface 112 can be maintained. That is, the first supporter 120 being in intimate contact with the first lens 110 does not adversely impact the performance characteristics of the first lens 110.

Figure 2:
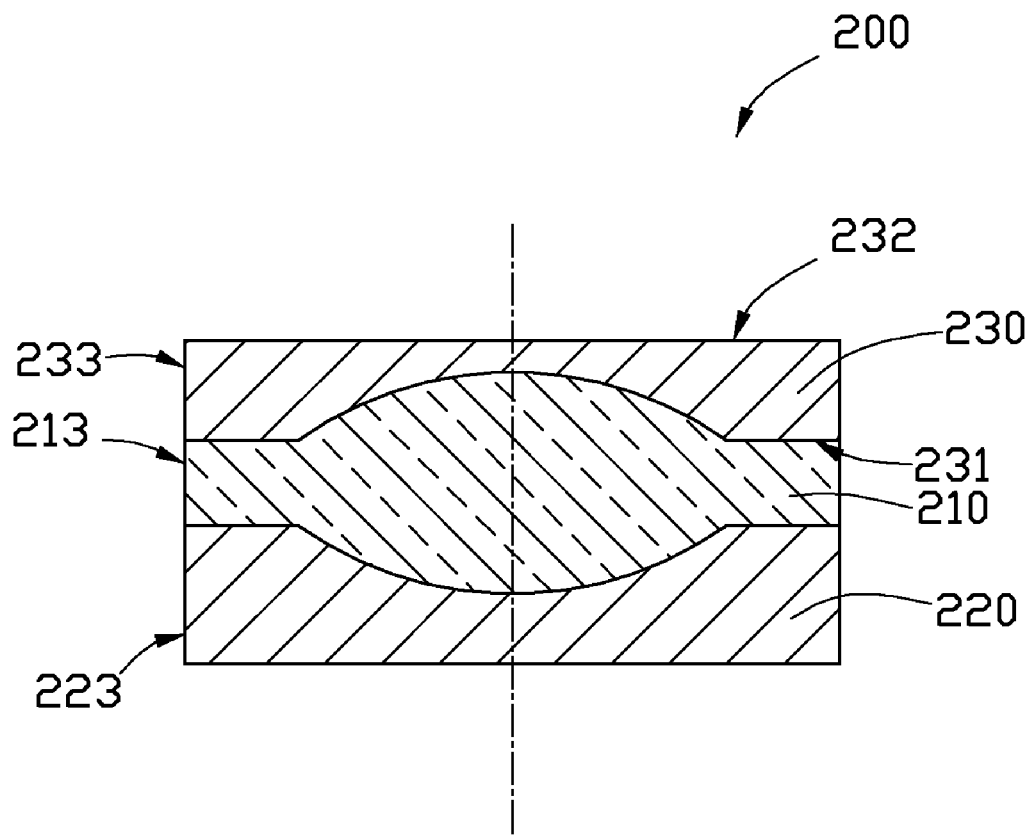
FIG. 2 is cross-sectional view of a lens assembly in accordance with a second embodiment, showing a central axis thereof as a broken line.

A lens assembly 200 according to a second embodiment is shown in FIG. 2. The lens assembly 200 is essentially similar to the lens assembly 100 of the first embodiment. However, the lens assembly 200 further has a second supporter 230 in addition to a first lens 210 and a first supporter 220.

The second supporter 230 has a third surface 231 and a fourth surface 232 at opposite sides thereof, and a peripheral second sidewall 233 interconnecting the third surface 232 and the fourth surface 232. The third surface 231 is fully in contact with the first lens 210. The fourth surface 232 is flat. The first supporter 220 has a peripheral first sidewall 223.

The refraction index of the first lens 210 is different from that of each of the first supporter 220 and the second supporter 230. The first lens 210, the first supporter 220, and the second supporter 230 are coaxially arranged. The diameters of the first lens 210, the first supporter 220, and the second supporter 230 are the same, to ensure that the first side 213 of the first lens 210, the first sidewall 223 of the first supporter 220 and the second sidewall 233 of the second supporter 230 can be aligned.

Figure 3:
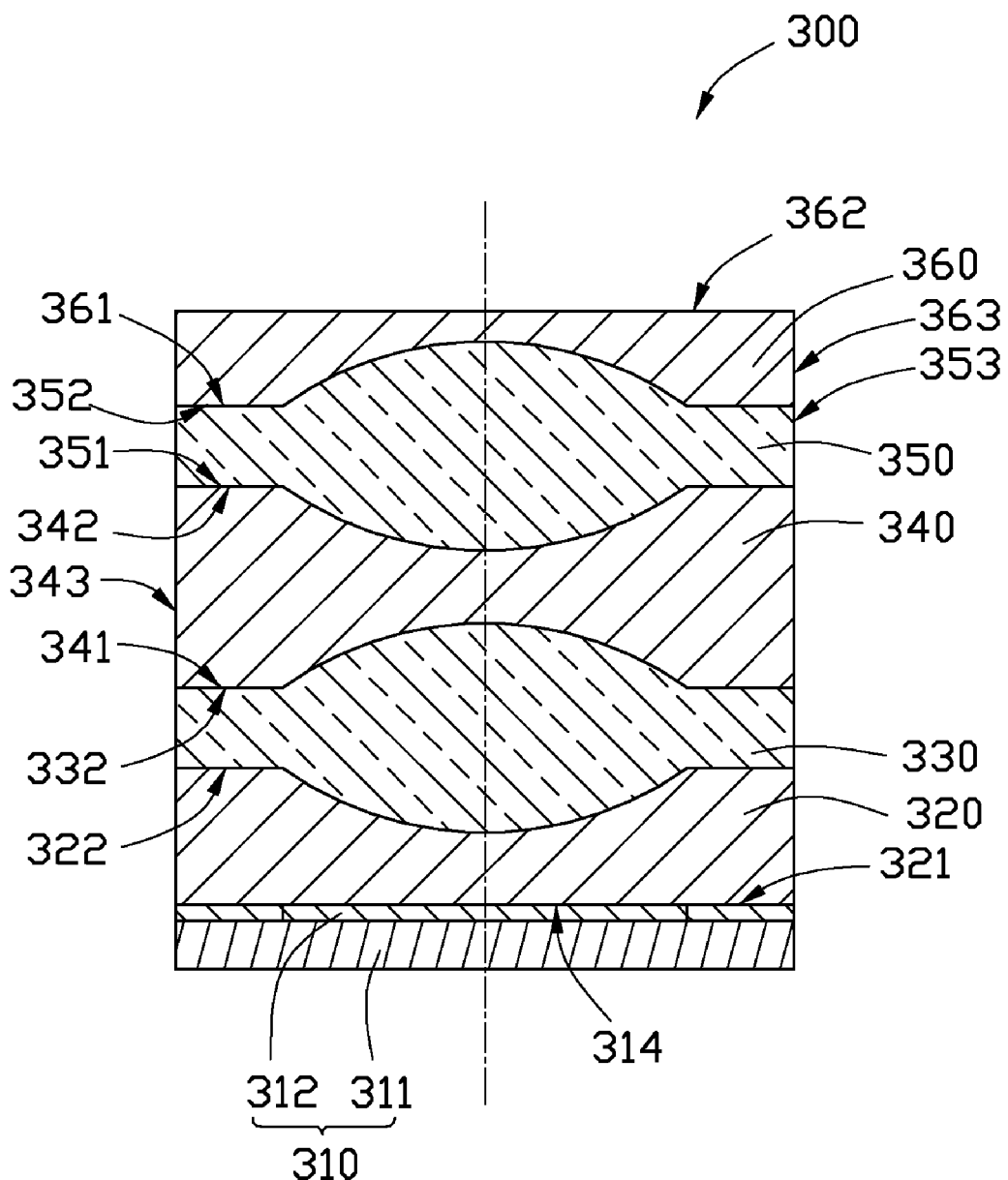
FIG. 3 is cross-sectional view of a lens assembly in accordance with a third embodiment, showing a central axis thereof as a broken line.

A lens assembly 300 in accordance with a third embodiment is shown in FIG 3. The lens assembly 300 is essentially similar to the lens assembly 100 of the first embodiment. However, the lens assembly 300 further has a filter 310, a second supporter 340, a second lens 350, and a third supporter 360, in addition to a first lens 330 and a first supporter 320.

The filter 310 includes a transparent substrate 311, and a filter film 312 deposited on the transparent substrate 311. An outer surface 314 of the filter 310 is in contact with a first surface 321 of the first supporter 320. The substrate 311 is able to transmit visible light, as well as reflect ultraviolet rays or infrared rays or both ultraviolet and infrared rays.

The second supporter 340 has a third surface 341 and a fourth surface 342 at opposite sides thereof, and a peripheral sidewall 343 interconnecting the third surface 341 and the fourth surface 342. The third surface 341 is in intimate contact with a first top surface 332 of the first lens 330. A first bottom surface (not labeled) of the first lens 330 is in intimate contact with a second surface 322 of the first supporter 320.

The second lens 350 has a second bottom surface 351 and a second top surface 352 at opposite sides thereof, and a peripheral second side surface 353 interconnecting the second bottom surface 351 and the second top surface 352. In this embodiment, the second lens 350 is a biconvex lens. In other embodiments, the second lens 350 can be a biconcave lens or a positive meniscus lens. The second bottom surface 351 is in intimate contact with the fourth surface 342 of the second supporter 340.

The third supporter 360 has a fifth surface 361 and a sixth surface 362 at opposite sides thereof, and a third sidewall 363 interconnecting the fifth surface 361 and the sixth surface 362. The fifth surface 361 is in intimate contact with the second top surface 352. The sixth surface 362 is flat.

The refraction index of the first lens 330 is different from that of each of the first supporter 320, the second supporter 340, and the third supporter 360. The refraction index of the second lens 350 can be the same as that of the first lens 330. The first lens 330, the second lens 350, the first supporter 320, the second supporter 340, and the third supporter 360 are coaxially arranged, and have the same diameter to ensure that all of these components can be aligned.

Figure 4:
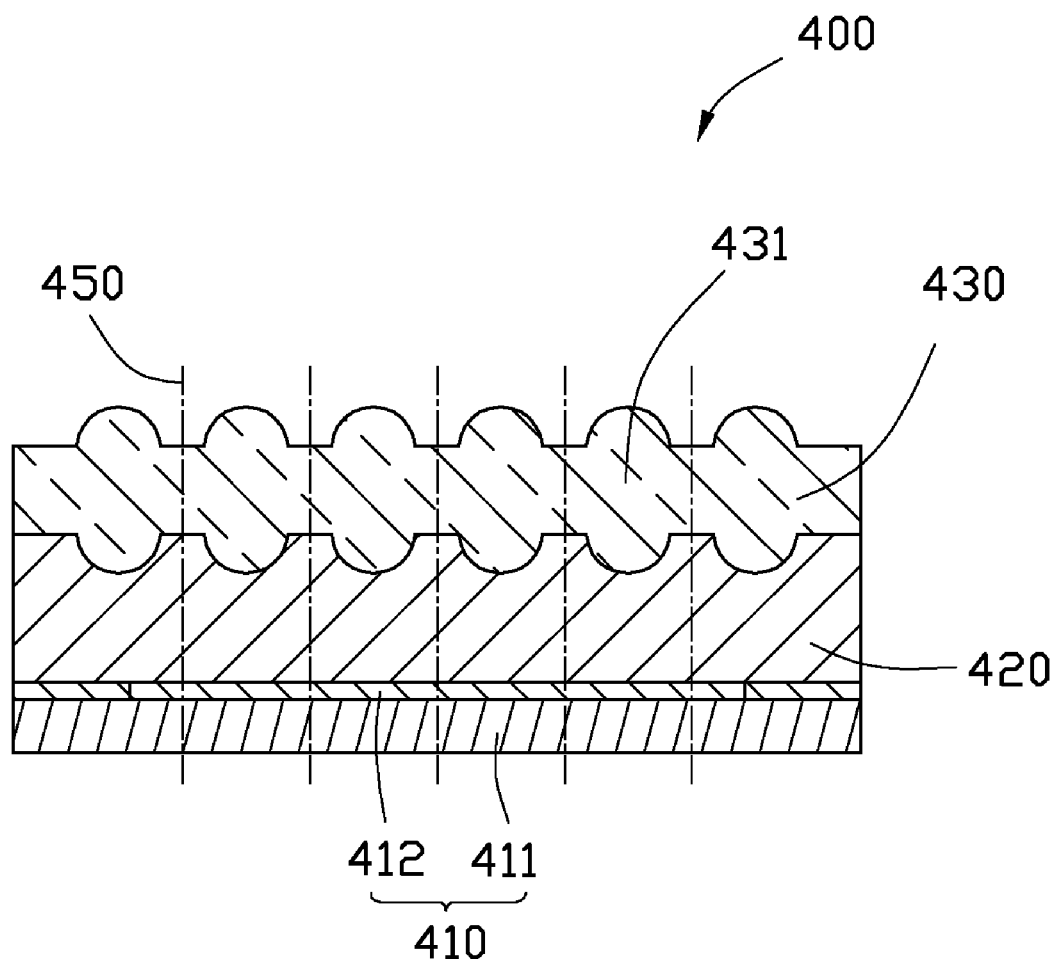
FIG. 4 is cross-sectional view of a lens assembly array in accordance with a fourth embodiment.

A lens assembly array 400 in accordance with a fourth embodiment is shown in FIG. 4. The lens assembly array 400 is similar in principle to the lens assemblies 100, 200, 300. The lens assembly array 400 comprises a filter 410, a supporter array 420, and a lens array 430 arranged in that order from bottom to top. The lens array 430 has a plurality of biconvex lenses 431. The supporter array 420 is arranged between the filter 410 and the lens array 430. The filter 410 comprises a transparent substrate 411, and a filter film 412 formed on the substrate 411. Each lens of the lens array 430 is coaxially aligned with a corresponding supporter portion of the supporter array 420. The lens assembly array 400 can be diced into a plurality of lens assemblies by cutting along a plurality of broken lines 450. In alternative embodiments, the lens assembly array 400 can further include another supporter array on the lens array 430 and another lens array on the additional supporter array.

A method of making a lens assembly (such as the lens assembly 300) in accordance with a fifth embodiment is described below.

Figure 5:
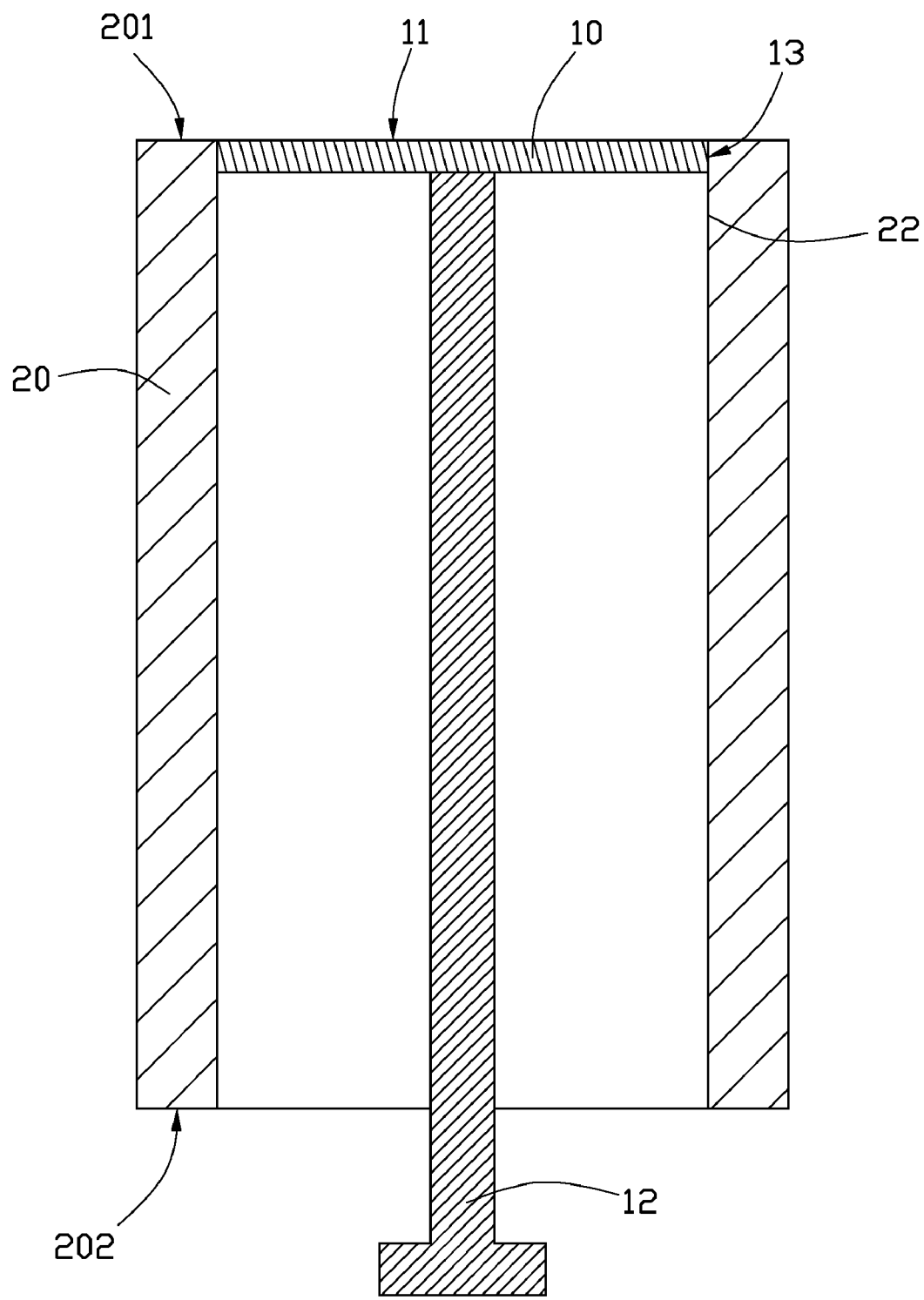
FIGS. 5-14 are cross-sectional views showing successive stages in a method of making a lens assembly in accordance with a fifth embodiment.

In step 1, as shown in FIG. 5, a platform 10 and a hollow cylindrical barrel 20 are provided. The platform 10 has a flat supporting surface 11 and an annular side surface 13. The hollow cylindrical barrel 20 has a cylindrical inner surface 22. The platform 10 is set inside the hollow cylindrical barrel 20, with the side surface 13 movably contacting the inner surface 22. The platform 10 is connected to and controlled by a driving shaft 12, so that the platform 10 can linearly move up and down inside the hollow cylindrical barrel 20. The hollow cylindrical barrel 20 has an annular first end surface 201 and an opposite annular second end surface 202. The distance that the platform 10 ascends or descends can be precisely controlled. In this way, the flat supporting surface 11 of the platform 10 and the inner surface 22 of the hollow cylindrical barrel 20 can cooperatively form a molding cavity 21 (see FIG. 6). The platform 10 is capable of moving inside the hollow cylindrical barrel 20 under a pushing force or a pulling force provided by the driving shaft 12, such that the molding cavity 21 can be enlarged or contracted.

Figure 6:
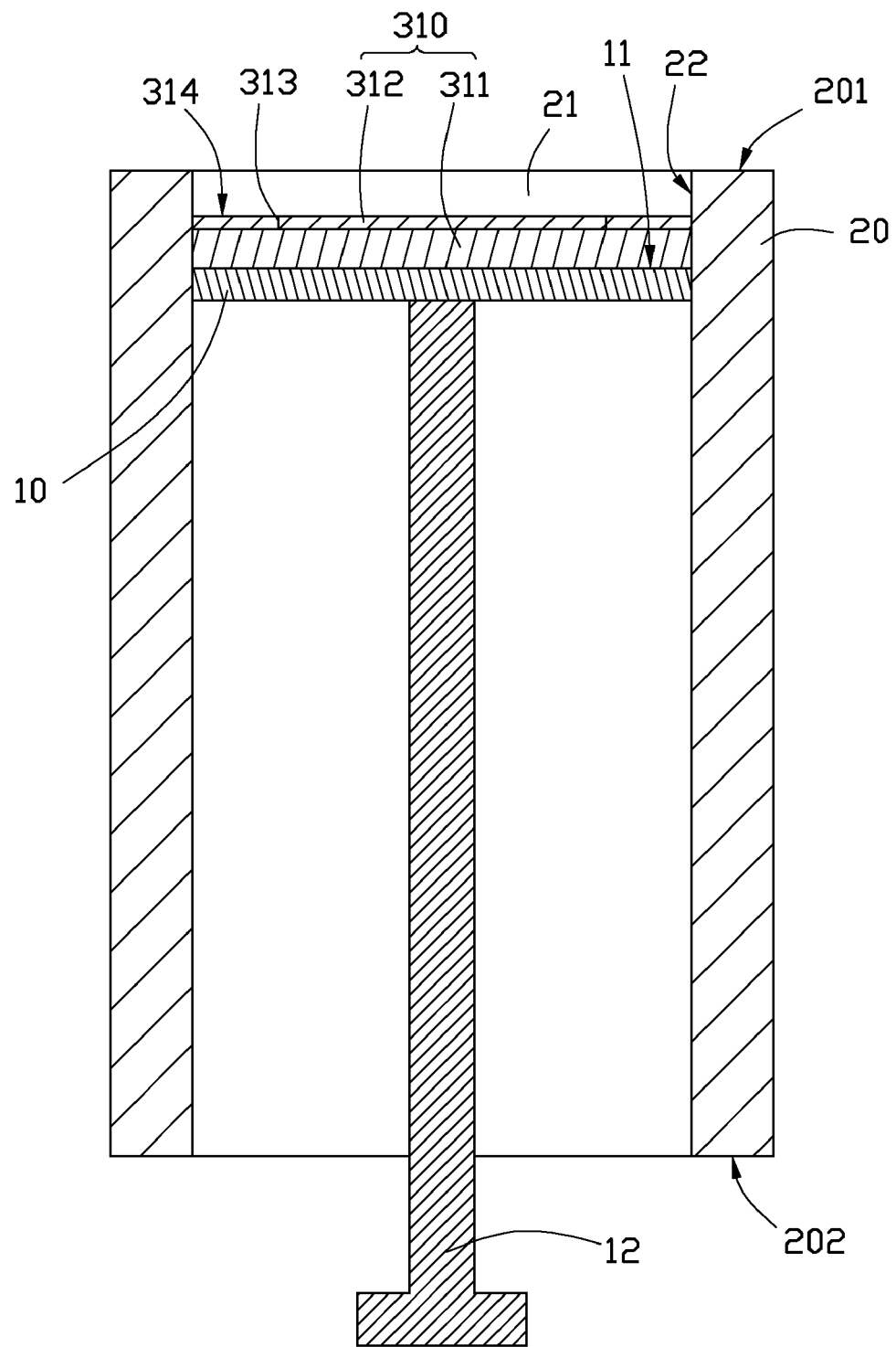

In step 2, as shown in FIG. 6, the filter 310 is put on the flat supporting surface 11 so that the flat supporting surface 11 is no longer exposed. At least one first alignment mark 313 is provided on or in the filter 310. The number and the position(s) of the at least one alignment mark 313 depend on, inter alia, the size and form of the lenses that are to be made. In the illustrated embodiment, there are two first alignment marks 313.

Figure 7:
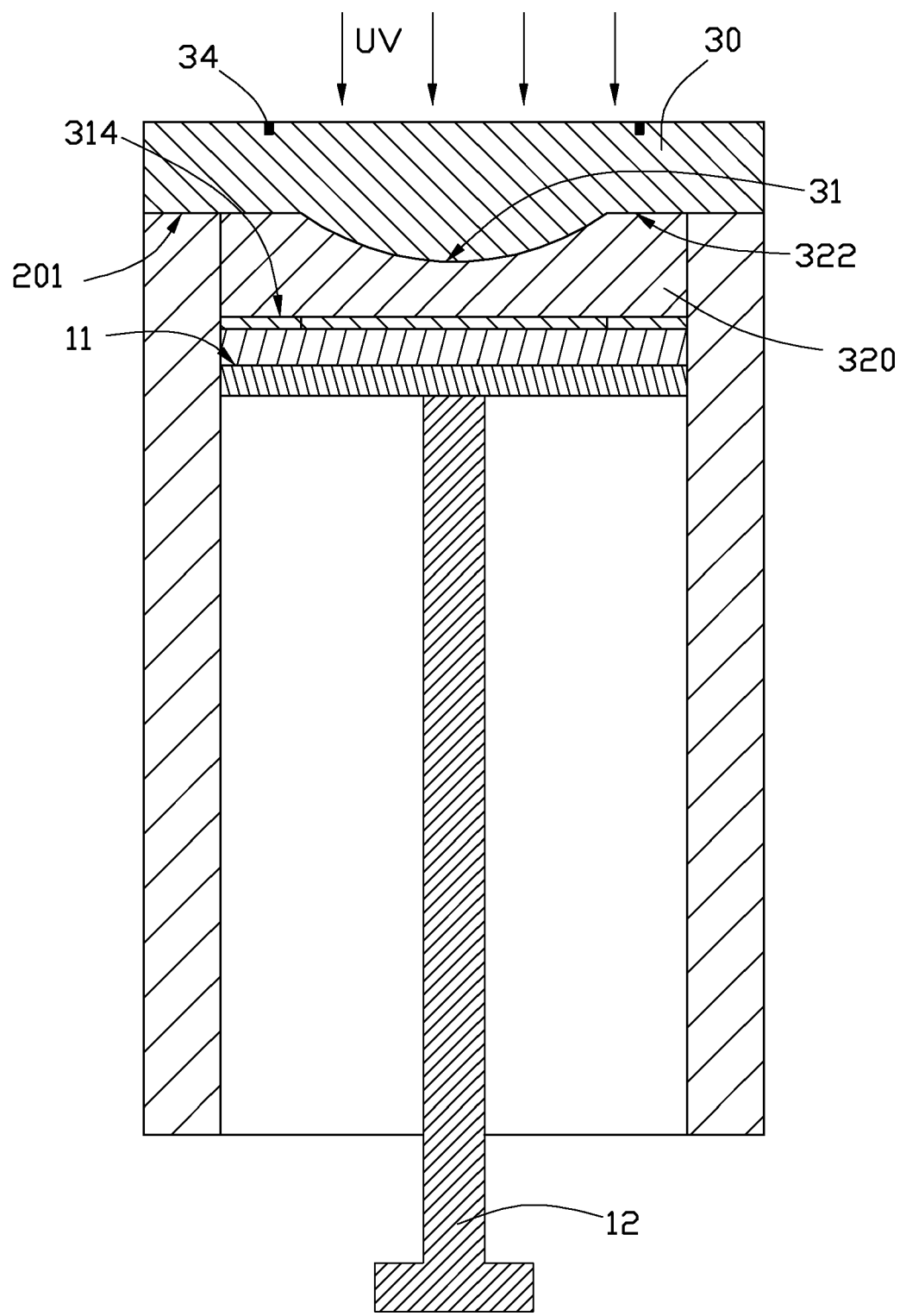
Figure 8:
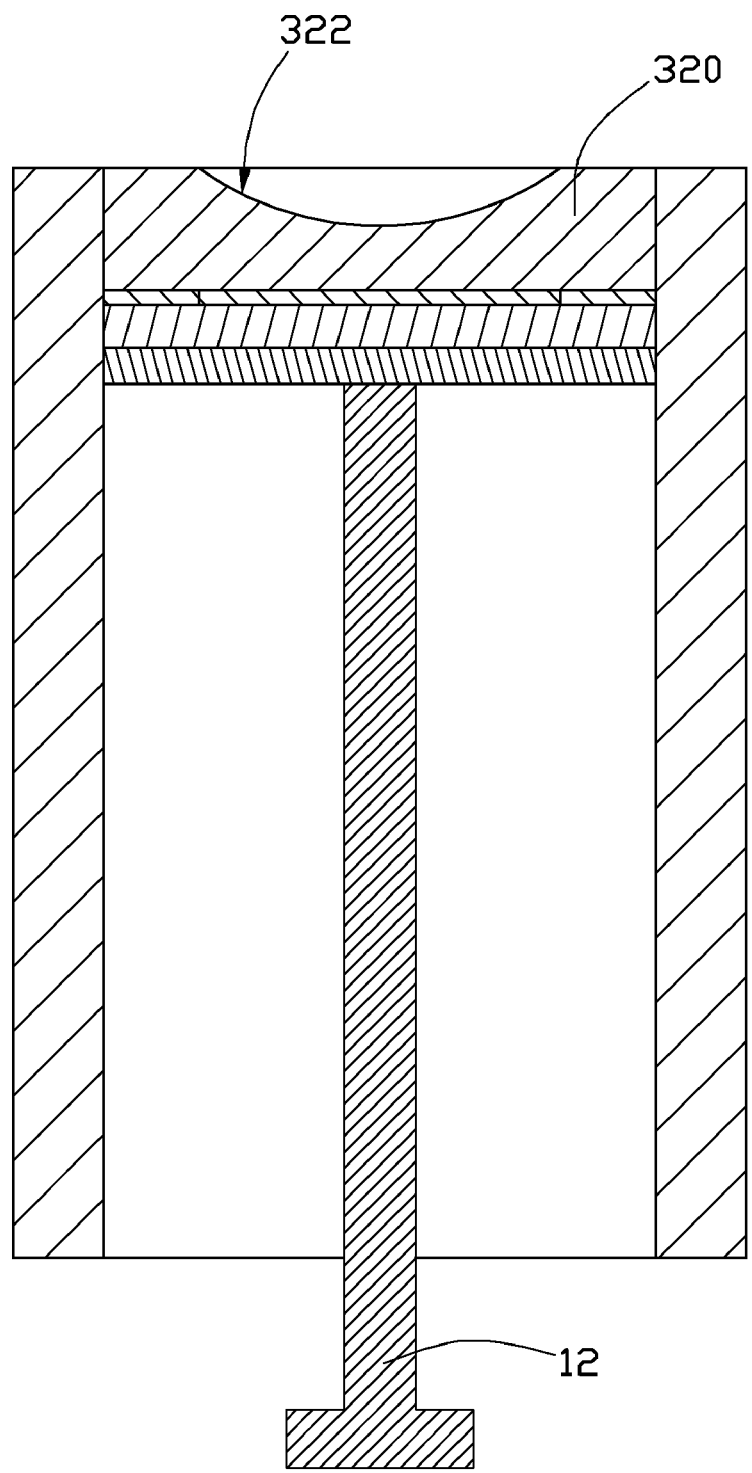

In step 3, the first supporter 320 is formed on the top surface 314 of the filter 310 by press molding, as shown in FIGS. 6 through 8.

Firstly, the position of the platform 10 is adjusted by moving the driving shaft 12 in order that the distance between the top surface 314 of the filter layer 312 and the first end surface 201 is equal to the maximum thickness of the first supporter 320.

Secondly, a molding material in a liquid, viscous, or plastically deformable state for making the first supporter 320 is provided. The molding material is arranged on the top surface 314, and is pressed by a first mold 30 to form the first supporter 320. The first mold 30 is transparent. The first mold 30 has a first pattern surface 31 that is complementary to the second surface 322 of the first supporter 320. At least one second alignment mark 34 is marked on the first mold 30. In the illustrated embodiment, there are two first alignment marks 34. The first mold 30 is placed above the first end surface 201, and the first alignment marks 313 are aligned with the second alignment marks 34. Then, the first mold 30 is pressed into the molding material until the first mold 30 contacts the first end surface 201. Excess molding material flows out from one or more gaps (not shown) between an edge of the first pattern surface 31 and a corresponding edge of the first end surface 201.

Thirdly, the uncured first supporter 320 is cured by thermal treatment or with ultraviolet (UV) rays. In the illustrated embodiment, UV rays are applied from above the first mold 30.

Fourthly, the first mold 30 and the first supporter 320 are separated from each other.

Figure 9:
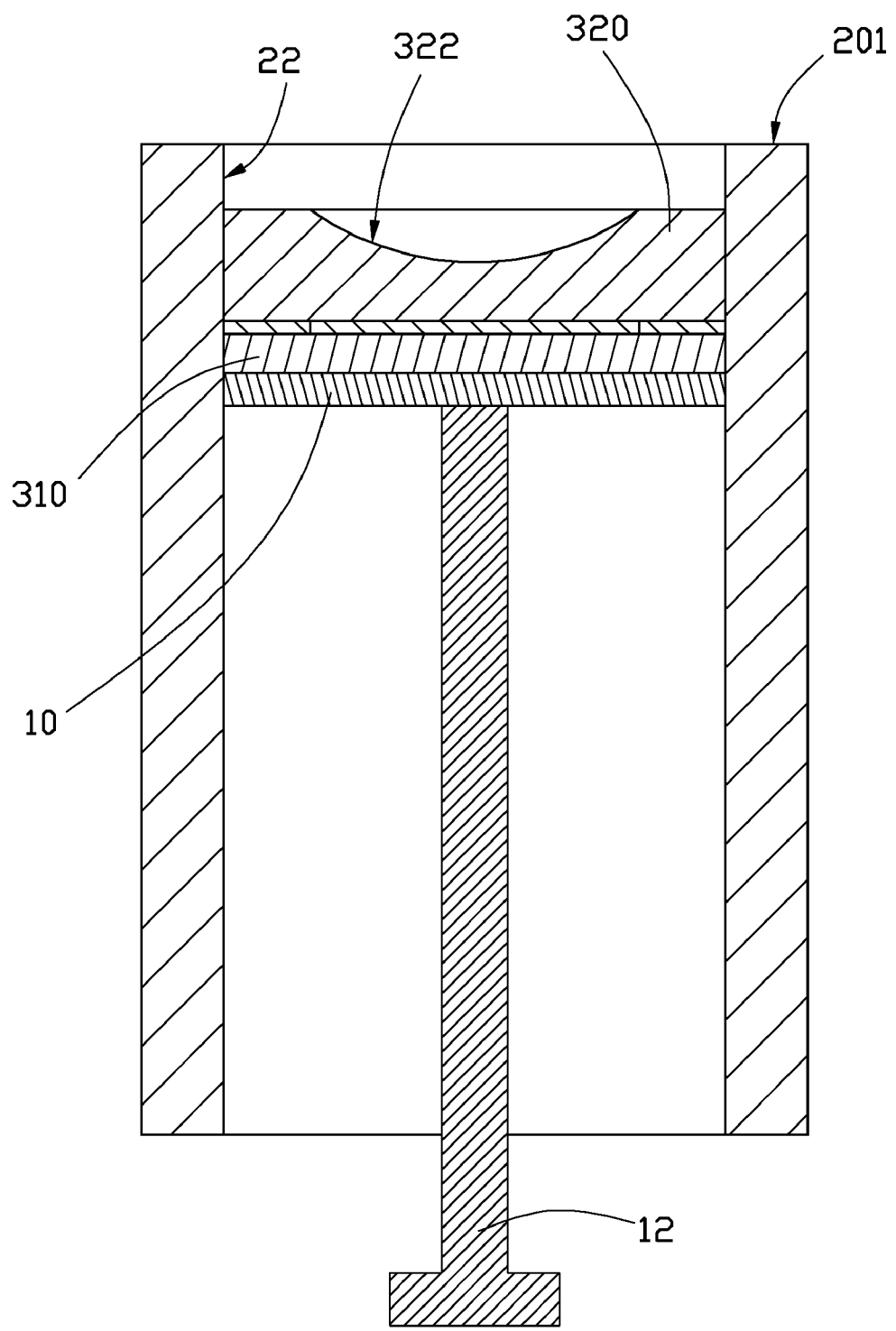
Figure 10:
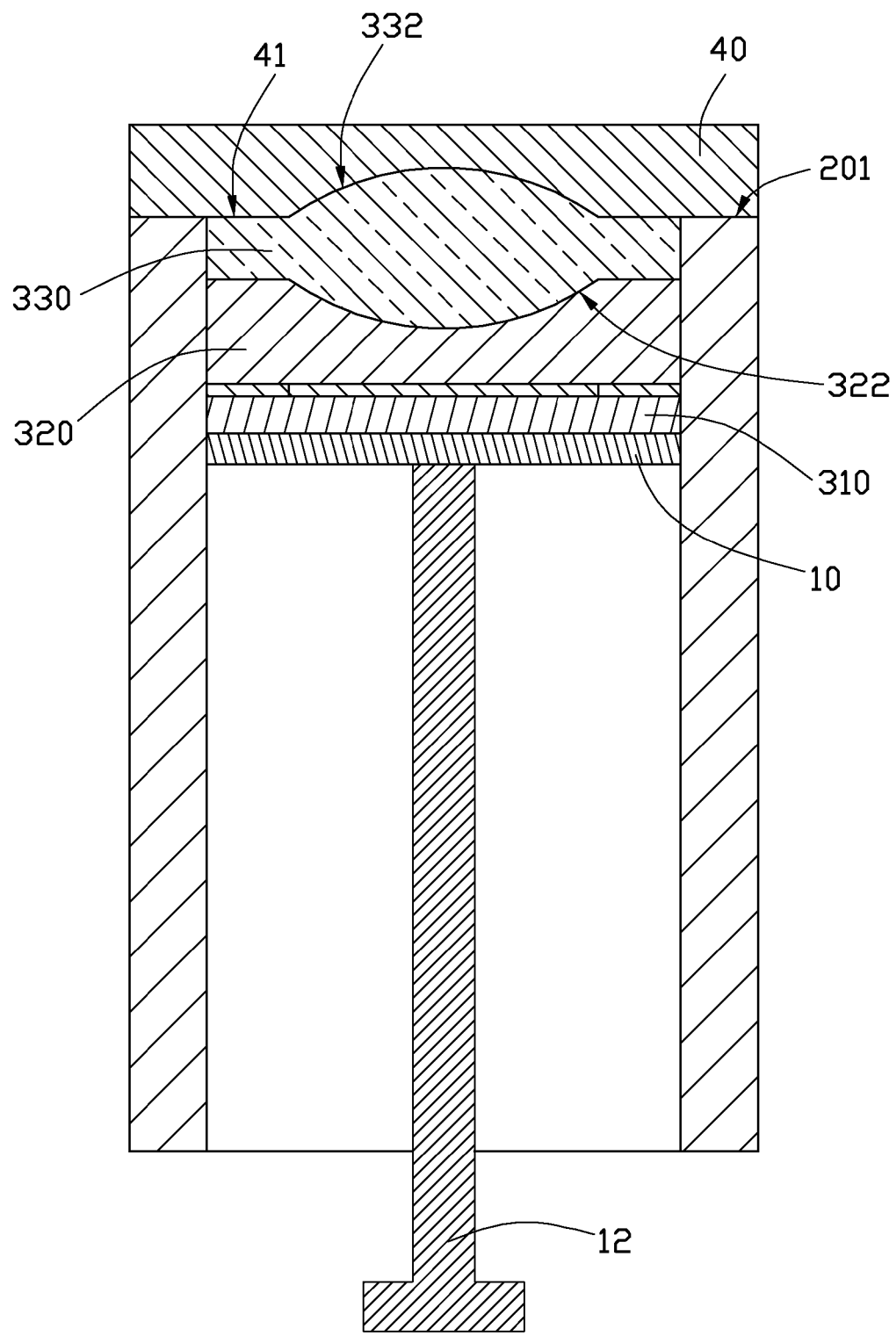
Figure 11:
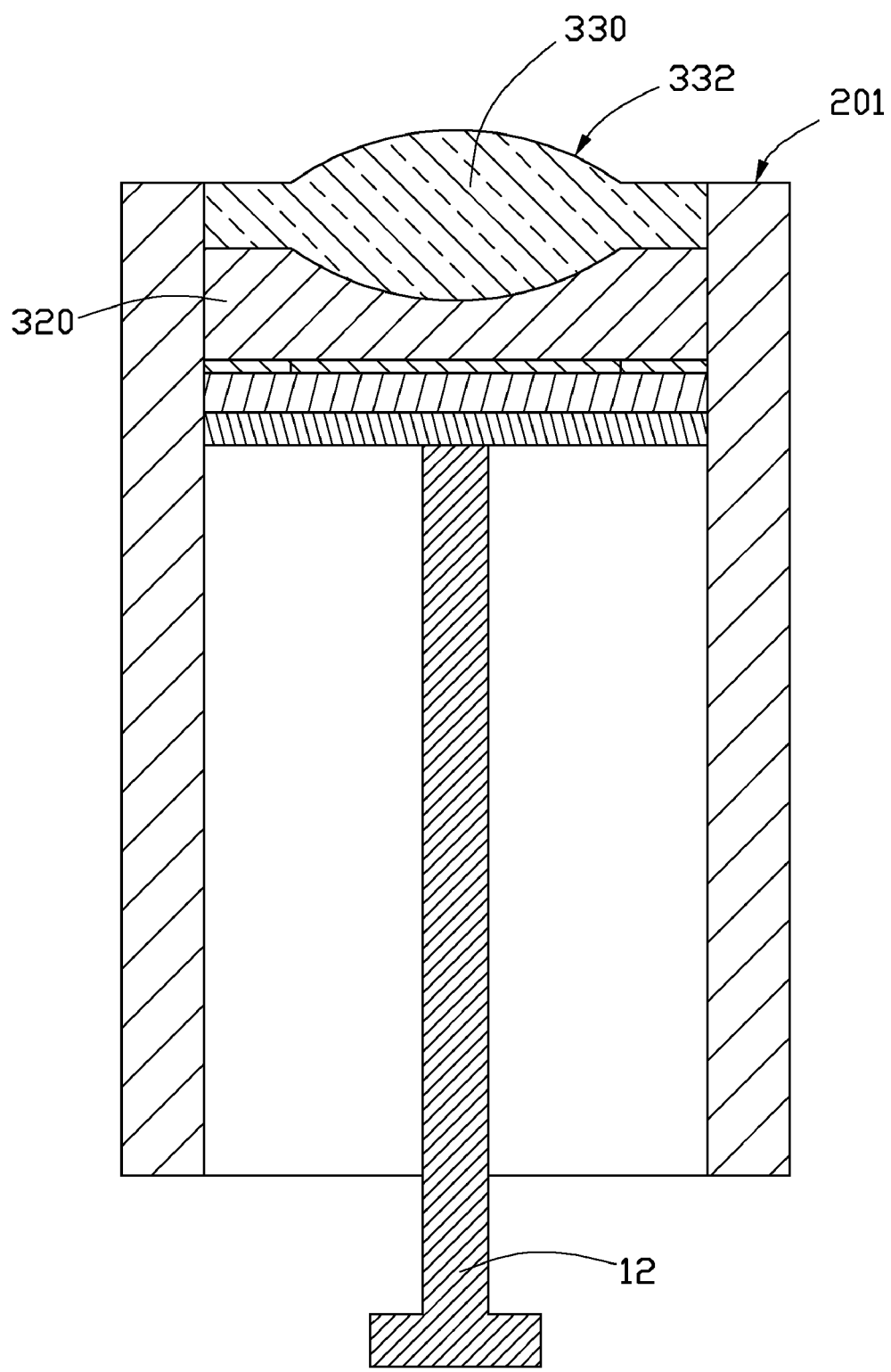

In step 4, the first lens 330 is formed on the cured first supporter 320 by press-molding, as shown in FIGS. 9 through 11.

Firstly, the position of the platform 10 is adjusted in order that the distance between the first end surface 201 and the second surface 322 of the first supporter 320 is equal to a thickness of a peripheral side surface (not labeled) of the first lens 330. Secondly, a molding material in a liquid, viscous, or plastically deformable state for making the first lens 330 is provided. The molding material is put onto the second surface 322. Thirdly, the molding material is pressed by a second mold 40 to form the first lens 330. The second mold 40 has a second pattern surface 41 that is complementary to the first top surface 332 of the first lens 330.

Figure 12:
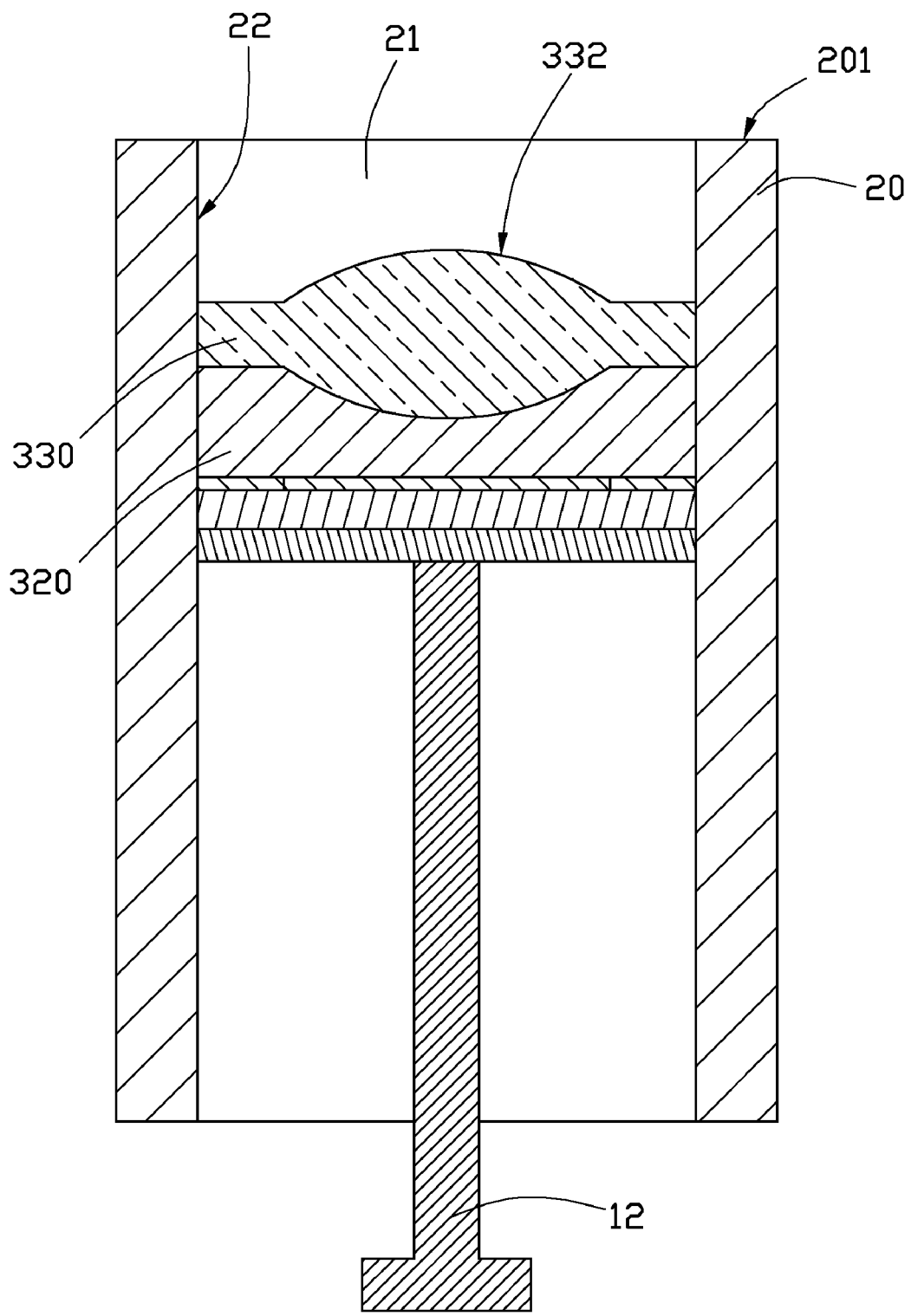
Figure 13:
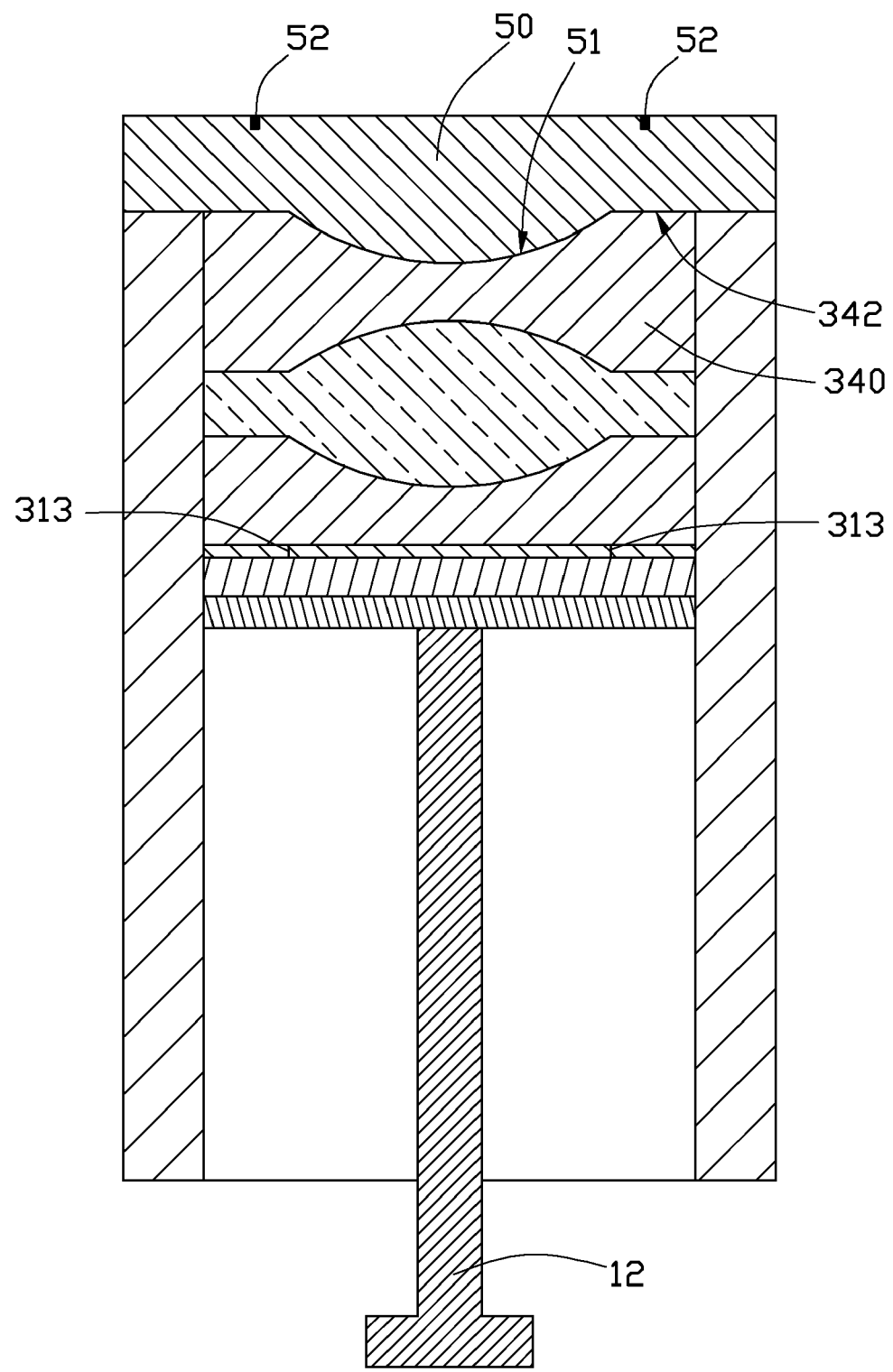

In step 5, the second supporter 340 is formed on the first top surface 332 by press-molding, as shown in FIG. 12 and FIG. 13.

The position of the platform 10 is adjusted in order that the distance between the first top surface 332 of the first lens 330 and the first end surface 201 is equal to a maximum thickness of the second supporter 340. Then a molding material in a liquid, viscous, or plastically deformable state for making the second supporter 340 is provided. The molding material is put onto the first top surface 332, and is pressed by a third mold 50 to form the second supporter 340. The third mold 50 has a third pattern surface 51 that is complementary to the second surface 342 of the second supporter 340. In the illustrated embodiment, there are two third alignment marks 52 on or in the third mold 50. The third alignment marks 52 are aligned with the first alignment marks 313. The third mold 50 is pressed into the molding material until the third mold 50 contacts the first end surface 201. The second supporter 340 is cured by thermal treatment or ultraviolet rays, and then the third mold 50 and the second supporter 340 are separated from each other.

In step 6, the second lens 350 is formed on the fourth surface 342 of the second supporter 340 in much the same way as the first lens 330 is formed (see above).

Figure 14:
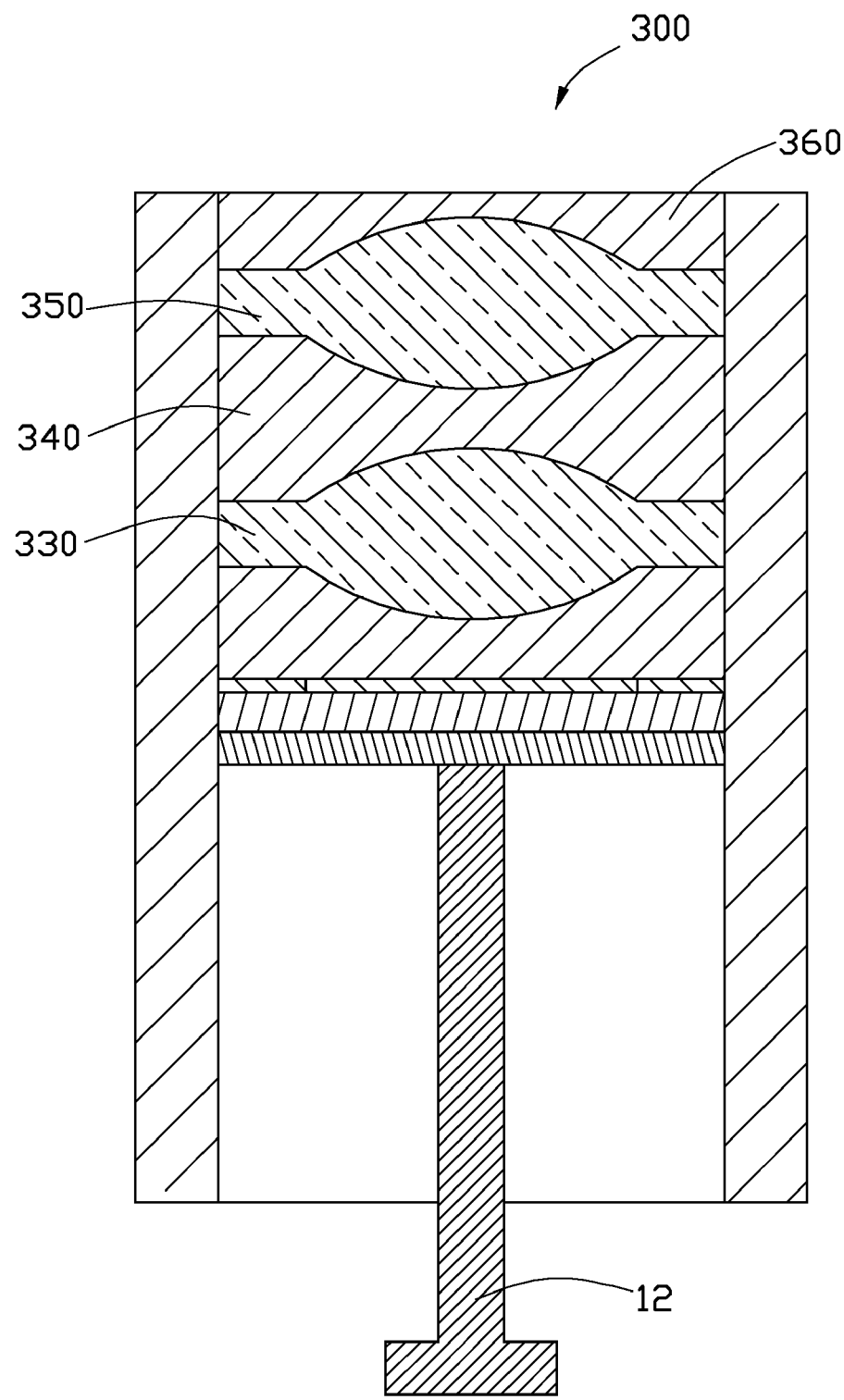
Figure 15:
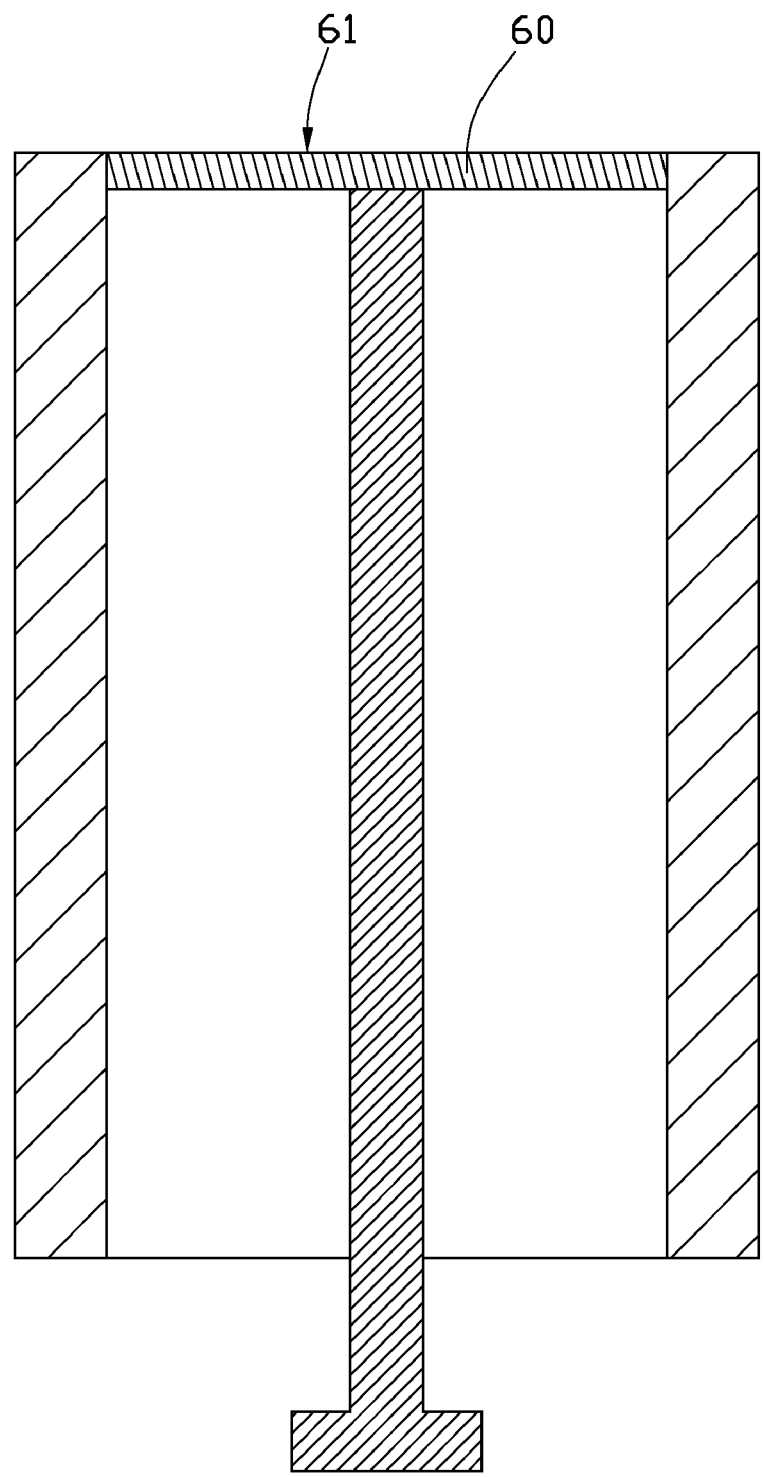
FIGS. 15-18 are cross-sectional views showing successive stages in a method of making a lens assembly array and a corresponding plurality of lens assemblies in accordance with a sixth embodiment.
Figure 16:
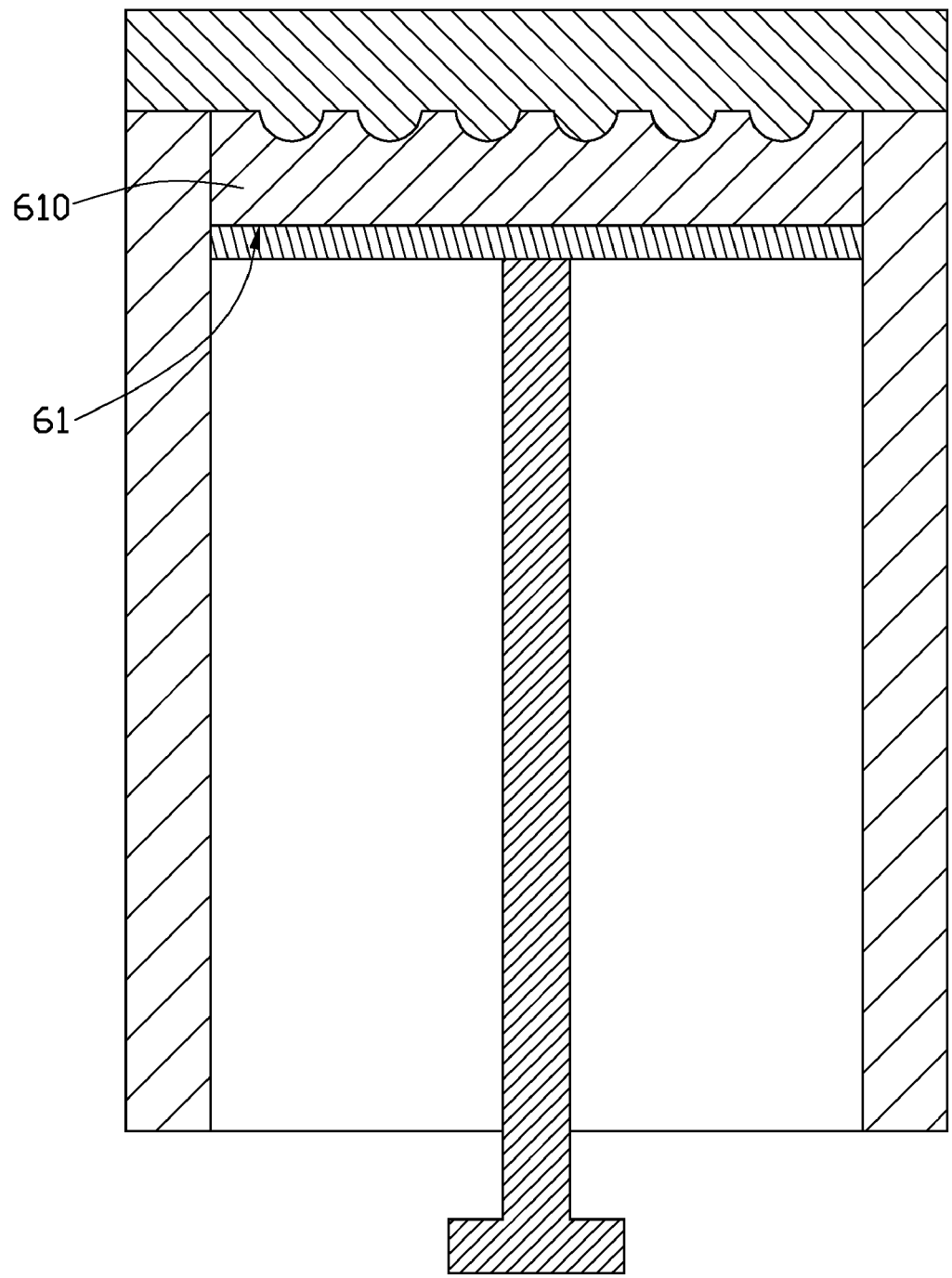
Figure 17:
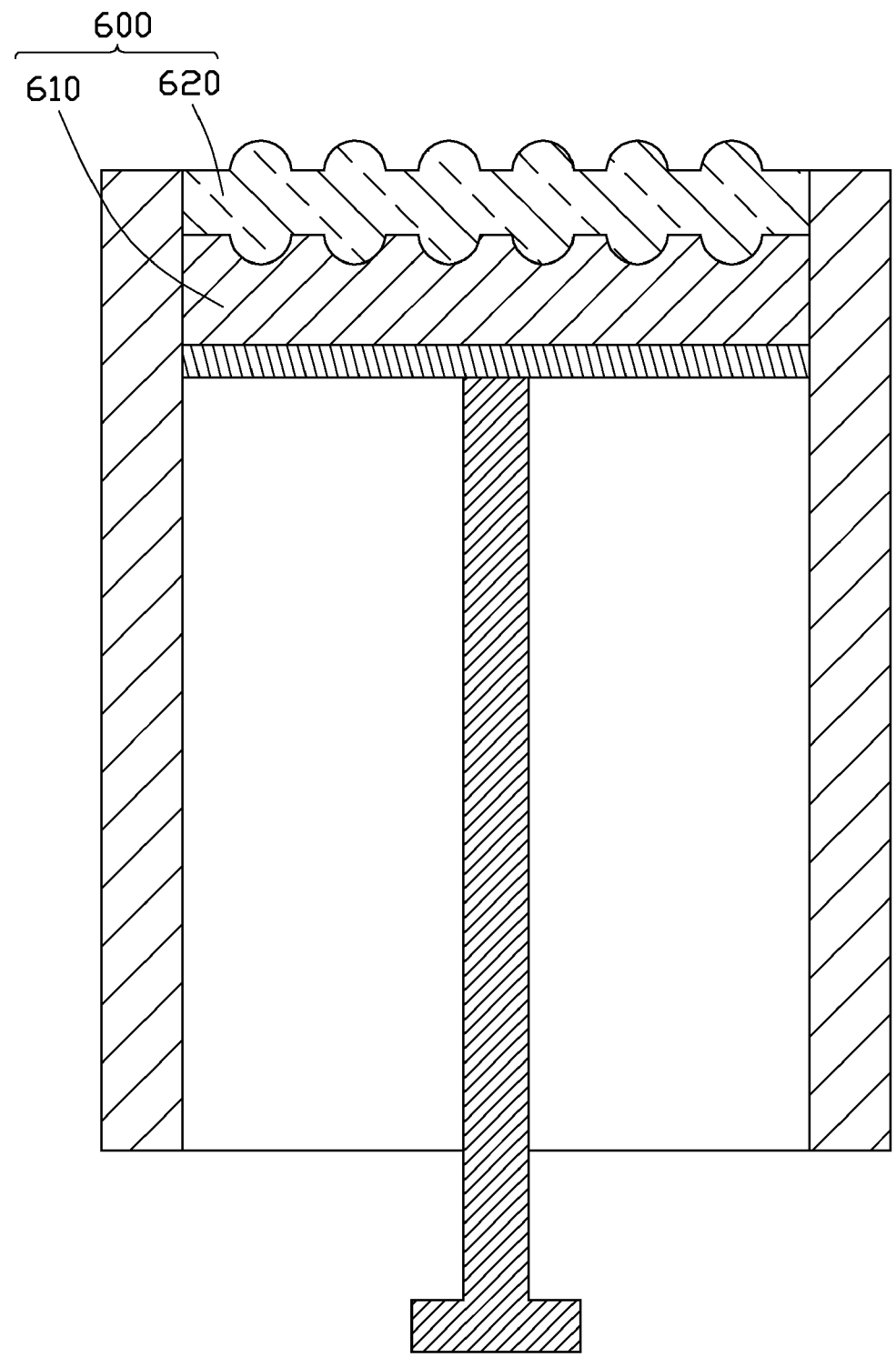

In step 7, the third supporter 360 is formed on the second top surface 352 of the second lens 350, as shown in FIG. 14. The third supporter 360 is formed in much the same way as the first supporter 320 is formed (see above). The lens assembly 300 can then be separated from the platform 10 and taken out of the hollow cylindrical barrel 20. Formation of the lens assembly 300 is thus completed.

FIGS. 15 to 18 show successive stages in a method of making a lens assembly array and a corresponding plurality of lens assemblies in accordance with a sixth embodiment. The lens assembly array may for example be similar to the lens assembly array 400, but without the filter 410. The method employs techniques similar to the method of the fifth embodiment described above. Accordingly, a full description of such techniques is not provided herein, for the sake of brevity.

In step 1, a platform 60 having a flat supporting surface 61 is provided.

In step 2, a molding material in a liquid, viscous, or plastically deformable state is provided. The molding material is put onto the supporting surface 61 and is pressed by a mold (not labeled) to form the supporter array 610. After curing the supporter array 610, molding material is put onto the supporter array 610 for making a lens array 620. The integrally formed supporter array 610 and lens array 620 is finally taken out of a cylindrical barrel (not labeled). Thus, a lens assembly array 600 is obtained.

Figure 18:
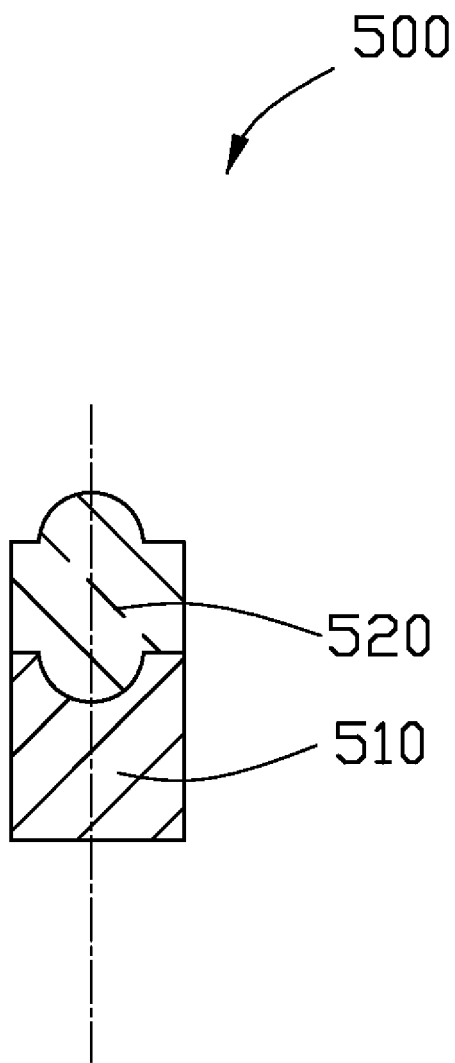

In step 3, the lens assembly array 600 is diced into a plurality of lens assemblies 500, one of which is shown in FIG. 18. The lens assembly 500 is comprised of a lens 520 and a supporter 510, which are coaxially stacked one on the other. A central axis of the lens assembly 500 is shown in a broken line.

In alternative embodiments, another supporter array and another lens assembly can be formed on the lens assembly array 600. The steps and techniques for forming the additional supporter array and lens assembly are similar to corresponding steps and techniques in the above-described method for making the lens assembly 300. Accordingly, a full description of such steps and techniques is not provided herein, for the sake of brevity.

According to the above-described method of making a lens assembly array, each lens portion (not labeled) of the lens array 620 is coaxial with a corresponding supporter portion (not labeled) of the supporter array 610. This is achieved by alignment marks (not shown) provided on the mold (not labeled), at least one of the supporter array 610 and the lens array 620, and the platform (not labeled). Unlike in a conventional method, the above-described method obviates the need for, e.g., producing a plurality of individual first optical components and a plurality of individual second optical components and then combining one first optical component with one second optical component to obtain each lens assembly.

It is understood that the above-described embodiments are intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. A method of making a lens assembly array, the method comprising:
   providing a cylindrical barrel and a platform linearly movable in the cylindrical barrel, the platform having a flat surface, the flat surface of the platform and an inner surface of the cylindrical barrel cooperatively forming a molding cavity;
   disposing first supporter array material on the flat surface under a condition that the flat surface is exposed, or disposing the first supporter array material above the flat surface under a condition that the flat surface is not exposed;
   providing a first mold;
   pressing the first supporter array material by the first mold to form a first supporter array, the first supporter array having a first supporting surface and a second supporting surface at opposite sides thereof, the first supporting surface being in contact with the flat surface under a condition that the flat surface was exposed, or being above the flat surface under a condition that the flat surface was not exposed;
   disposing first lens array material on the second supporting surface, a refraction index of the first lens array material being different from a refraction index of the first supporter array material;
   pressing the first lens array material by press molding to form a first lens array, the first lens array having a first bottom surface and a first top surface at opposite sides thereof, the first bottom surface being in contact with the second supporting surface, and the first supporter array and the first lens array cooperatively forming a lens assembly array; and
   separating the lens assembly array from the platform and removing the lens assembly array from the cylindrical barrel.

2. The method according to claim 1, further comprising disposing second supporter array material onto the first top surface after the first lens array is formed, and pressing the second supporter array material to form a second supporter array on the first lens array by press molding.

3. The method according to claim 1, wherein prior to disposing the first supporter array material onto the flat surface, a filter is disposed on the flat surface, and the first supporter array material is disposed on the filter.

4. The method according to claim 3, wherein the filter has a first alignment mark, the first mold has a second alignment mark, the second alignment mark corresponds to the first alignment mark, and the method further comprises aligning the second alignment mark with the first alignment mark prior to pressing the first supporter array material by the first mold.

5. The method according to claim 4, further comprising disposing second supporter array material on the first top surface, providing a third mold, and pressing the second supporter array material by the third mold to form a second supporter array, the second supporter array having a third supporting surface and a fourth supporting surface at opposite sides thereof, the third supporting surface being in contact with the first top surface.

6. The method according to claim 5, wherein the third mold has a third alignment mark, and the method further comprises aligning the third alignment mark with the first alignment mark of the filter prior to pressing the second supporter array material by the third mold.

7. The method according to claim 5, further comprising disposing second lens array material on the fourth supporting surface, and pressing the second lens array material by press molding to form a second lens array, a refraction index of the second lens array material being different from a refraction index of the second supporter array material.

8. The method according to claim 7, wherein the platform is capable of linearly moving up and down inside the cylindrical barrel under a pushing or pulling force provided by a driving shaft, such that the molding cavity is selectively enlarged or contracted.

* * * * *